United States Patent Office 2,884,398
Patented Apr. 28, 1959

2,884,398

COMPOSITION COMPRISING UNSATURATED POLYESTER, VINYL MONOMER AND CYCLIC TERPENE, CURED PRODUCT THEREOF AND PROCESS OF PREPARING THE CURED PRODUCT

Philip A. Thomas, East Orange, and John L. Welch, Jr., Bloomfield, N.J., assignors to Union Carbide Corporation, a corporation of New York No Drawing. Application April 10, 1956
Serial No. 577,188

14 Claims. (Cl. 260—29.8)

This invention relates to linear polyester-vinyl monomer compositions, and more especially to such compositions which can be copolymerized to yield solid, infusible plastic materials which are substantially devoid of cracks, checks or fissures.

Copolymerizable linear polyester-vinyl monomer compositions have found considerable use in industry. Their use as casting or potting compounds and in connection with laminates formed with glass fibres can be noted as illustrations.

Although polyester-vinyl monomer compositions have found wide use they still possess certain disadvantages which thus far have limited their effectiveness for certain purposes. A principal disadvantage of such compositions has been their tendency to form plastic objects which develop cracks, checks or fissures, either during or subsequent to the curing operation, particularly where objects having thick sections or sections of different thicknesses are desired.

Efforts to overcome the aforesaid disadvantage have been made by other workers in this field. One suggestion was to use a carefully regulated curing cycle, beginning with a comparatively low temperature, around 50° C., and gradually increasing the temperature to a final curing temperature of about 100° C. However, even under these prolonged and commercially-disadvantageous conditions imperfect casings resulted. The addition of mineral fillers, in amounts, for example, of 40–100 parts per 100 parts by weight of resin has also been suggested. This expedient is only partly effective; and, moreover, the field of use of the resins is narrowed, as transparent coatings cannot be made by this method. Still another suggestion of which we are aware is one which employs a special gelation inhibitor; but this is not recommended for use in connection with the conventional linear polyester-vinyl monomer compositions having phenolic stabilizers.

An object of our present invention is to provide linear polyester-vinyl monomer compositions which can be converted in a technically-simple and commercially-feasible manner into solid, infusible plastic materials which are substantially devoid of cracks, checks or fissures.

A specific object of this invention is to provide a novel composition suitable for use in making clear, check-free, crack-free, clear cast objects and laminates with glass fibres.

In accordance with our present invention, we have attained the foregoing and other objects, without the disadvantages of prior teachings, by application of our finding that cyclic terpenes, when added in small amounts to a copolymerizable mixture of a linear polyester and a vinyl monomer, are effective to yield substantially check-free, crack-free and fissure-free plastic objects when said mixture is cured at elevated temperatures.

The linear polyester-vinyl monomer copolymerizable mixtures usable in accordance with our invention are prepared in known manner. The cyclic terpenes can be incorporated in the copolymerizable mixture at the time of its formation or any time prior to use, i.e., prior to the making of castings, laminates, or potting compositions. Inhibitors, if desired, can be added to the composition, desirably at the time of its formation, especially if the mixture is to be stored for a substantial period. Catalysts and promoters or activators can be added at the time the composition of this invention is prepared, if desired, but it is advantageous to add these shortly prior to use, where praticable.

Our present invention is applicable to linear polyesters in general. These include the polyesters prepared by reacting a glycol such as ethylene glycol, propylene glycol, di- and tri-ethylene glycol with an unsaturated dibasic acid such as maleic acid or its anhydride, fumaric acid. In order to avoid brittle products, part of the unsaturated dibasic acid is advantageously replaced by dibasic acids free of olefinic unsaturation or their anhydrides such as phthalic acid or anhydride, tetrahydrophthalic anhydride, adipic acid, sebacic acid, or the like. It is noted that "carbic" acid functions essentially as a saturated dibasic acid in conjunction with maleic acid, as described in U.S. 2,475,731. When such dibasic acids are employed it is advisable to use not more than between about 0.1 mole and 1 mole of saturated acid per mole of unsaturated acid.

Accordingly, wherever the context of the specification and claims herein so admits or requires, the term "linear polyesters," as used to refer to operable polyesters herein, is intended to mean those polyesters prepared from essentially unsaturated acids and, desirably, limited amounts of saturated acids.

The linear polyesters employed in accordance with our invention are widely known. They have been described in numerous patents and publications, including U.S. Letters Patent Nos. 2,255,313 and 2,475,731. Insofar as these patents teach the preparation and properties of the polymerizable linear polyesters these patents are made a part of this disclosure.

The preparation of a typical polyester is as follows.

One and one-tenth (1.1) moles of a glycol such as ethylene glycol is charged to a kettle and a slow stream of inert gas is introduced. The charge is heated to about 80° C. and one mole of dibasic acid anhydride such as maleic anhydride is added and mixed with the glycol. The temperature is increased to about 180° C. and held at that temperature for approximately three hours. The temperature is then increased to 200° C. and maintained thereat for about two hours and is then increased to about 205–210° C. It is held at this temperature until the desired acid number is attained which is usually about 30–50.

As in the case of the linear polyesters, our invention is applicable to vinyl monomers in general. Styrene and vinyl toluene are two specific vinyl monomers which give excellent results. In addition, halogen-substituted styrenes, such as ortho-chlorostyrene and dichlorostyrene can be mentioned as examples of operable vinyl monomers.

Among the cyclic terpenes we have found to be effective in accordance with our invention are dipentene, limonene, terpinolene, pinene, fenchene and terpene-containing substances such as turpentine oil and pine oil.

In addition to the linear polyesters, vinyl monomers and cyclic terpenes, other ingredients may be used in preparing the compositions of this invention. Such ingredients which can be used include polymerization inhibitors, catalysts and promoters or activators. Hydroquinone and p-tert.-butyl catechol are suitable inhibitors. Peroxide catalysts, e.g., benzoyl peroxide, methyl ethyl ketone peroxide and cyclohexanone peroxide, to help cure the compositions to hard solids, are employed. More rapid gelation is promoted by activators such as cobalt in the form of the octoate, the hexoate or the naphthenate.

Although the various ingredients which can be employed in accordance with our present invention have been specifically enumerated, it will be understood by those skilled in the art that, if desired, two or more members of the same group may be used in admixture. Thus, e.g., a mixture of the linear polyesters formed by the esterification of maleic anhydride with ethylene glycol and propylene glycol can be used. So also, a mixture of styrene and vinyl toluene may be employed. Similarly, two or more terpenes can be used simultaneously. The polymerization inhibitors, catalysts and promoters may also be used in admixture, if desired.

In general, we have found that advantageous results are obtained when the linear polyester-vinyl monomer composition comprises from about 2–4 parts by weight of the linear polyester components to about 1 part by weight of the vinyl monomer components. Amounts of vinyl monomer in excess of about one part by weight to about two parts by weight of linear polyester are not recommended as the resulting cured composition will likely contain cracks and fissures. Amounts of vinyl monomer less than about one part by weight to about 4 parts by weight of linear polyester may also be employed but the resulting composition will likely not be substantially cured to an infusible state.

The amounts of inhibitors, catalysts and promoters employed are very small. Customarily, the inhibitors are used in amounts from about 0.001% to 0.01% by weight, based on the combined weight of the linear polyester-vinyl monomer. The amount of catalyst usually used is about 0.1–2.0% by weight, on the same basis. The amount of promoters used is likewise small, being of the order of 0.1 to 1.0% by weight, on the same basis.

We have found that small amounts of cyclic terpenes give the desired results. Amounts as low as 0.5% give advantageous results in many cases. Amounts up to 7% are required in other cases. The amount to be used depends on the terpene, the composition of the linear polyester-vinyl monomer, and on the conditions of cure. In general, the higher the temperature at which the copolymerizable mixture is cured the more terpene is required. The stated amounts of the terpenes, as given throughout the specification and claims, are by weight, based on the total amount of the linear polyester-vinyl monomer mixture, including inhibitors, catalysts and promoters, or other ingredients.

In forming the solid, infusible, substantially check-free, crack-free and fissure-free plastic objects of this invention from the novel compositions herein described, we have found that curing periods of 20–30 minutes under elevated curing temperatures of about 100°–150° C. are sufficient. The higher curing periods are used at the lower curing temperatures, the higher temperatures resulting in the lower curing periods.

The absence of any special curing conditions in making the aforesaid infusible plastic objects in accordance with our invention is of considerable practical significance. The novel compositions of this invention can be rapidly cured without danger of cracking by subjecting immediately to curing temperatures. Long drawn-out curing cycles, with their consequent disadvantages, are made unnecessary by our present invention.

In general, the novel copolymerizable compositions of our invention resemble conventional linear polyester-vinyl monomer compositions, insofar as their appearance and characteristics are concerned. However, in the important respect that our novel polymerizable compositions can be cured at elevated temperatures to give plastic objects having the aforesaid check-free, etc. desirable properties, they differ materially from known polyester-vinyl monomer compositions.

When our compositions are employed as potting compositions, it is found that the tendency for the composition to crack around inserted objects is materially less than is the case with known polymerizable polyester-vinyl monomer compositions.

When our compositions are employed in the fabrication of glass fibre-resin laminates, our compositions are not defective as regards the normal tendency of known polyester-vinyl monomers to form areas having excessive concentration of polyester-vinyl resin. Such areas develop cracks and checks.

Our invention is further illustrated by the following examples. The parts are given by weight, unless otherwise stated.

The polyester referred to in the examples was made as follows:

The polyhydric alcohol is charged to a kettle, and a slow stream of inert gas such as nitrogen is introduced. The charge is heated to about 80° C. and the dibasic acid or anhydride is added and mixed with the alcohol. The temperature is increased to about 180° C. and maintained thereat for about 3 hours. The temperature is then increased to about 200° C., maintained thereat for about 2 hours and then increased to about 205°–210° C. The temperature is held at this level until the desired acid number is attained.

EXAMPLE I (a) A polyester was prepared by reacting a mixture of 0.6 mole of maleic anhydride and 0.4 mole of phthalic anhydride with 1.1 molar quantity of propylene glycol after the manner hereinbefore described, to an acid number of about 45.

(b) Two and one-half parts of the polyester in (a) were mixed with one part of styrene. The resulting composition had a viscosity of about 1900–2500 centipoises (25° C.).

EXAMPLE II (a) A polyester was prepared as in Example I except that a mixture of 0.5 mole maleic anhydride and 0.5 mole phthalic anhydride was reacted with a mixture of 0.65 mole diethylene glycol and 0.45 mole propylene glycol. The acid number of this polyester was 32.

(b) Three parts of the polyester in (a) were mixed with one part of styrene. The resulting composition had a viscosity of about 2700–3100 centipoises (25° C.).

EXAMPLE III (a) A polyester resin was prepared by reacting a mixture of 0.75 mole maleic anhydride and 0.25 mole of cis-3,6-endomethylene delta-4-tetrahydrophthalic acid with 1.1 molar quantity of propylene glycol after the manner described in Example I. The acid number of the polyester was 30.

(b) Two parts of the polyester resin was mixed with one part of styrene. The resulting composition had a viscosity of about 1500–2000 centipoises (25° C.).

EXAMPLE IV (a) A polyester resin was prepared by reacting a mixture of 0.3 mole maleic acid, 0.3 mole phthalic anhydride, 0.4 mole adipic acid with a 1.1 molar quantity of diethylene glycol after the manner described in Example I. The acid number of the polyester was 30.

(b) Four parts of the polyester resin was mixed with one part of styrene. The resulting composition had a viscosity of 800–1000 centipoises.

(c) Four parts of the polyester styrene composition of Example I(b) were mixed with one part of the composition of this Example IV(b), and one quarter part of styrene. The viscosity of this composition was about 850–975 centipoises (25° C.).

The compositions of the above examples were mixed with different proportions of catalysts and different amounts of modifiers. Then an equal volume proportion of each separate composition was cast into disks (2½ inches diameter, by ½ inch thickness) and cured at various temperatures. The time of the cure was about thirty minutes at the lower temperature and about twenty minutes at the higher temperatures. The catalyst used was a paste composed of 50% benzoyl peroxide and 50% tricresyl phosphate.

The results are recorded in the following tables and show the amounts required of different modifiers to prevent cracking in the disk castings.

*Table I*

QUANTITY OF DIPENTENE REQUIRED TO STOP CRACKING IN DISK CASTING

| Temperature | Quantity given in parts/100 parts of resin | | | |
| --- | --- | --- | --- | --- |
| | Ex. I(b) | Ex. II(b) | Ex. III(b) | Ex. IV(c) |
| Catalyst—1½%: | | | | |
| 250° F. (121° C.) | 2½ | ½ | 4 | ½ |
| 300° F. (149° C.) | 3½ | 1½ | 5 | 1½ |
| Catalyst—2%: | | | | |
| 210° F. | 2½ | ½ | 5 | ½ |
| 250° F. | 3½ | 1 | 7 | 1 |

*Table II*

QUANTITY OF TERPINOLENE REQUIRED TO STOP CRACKING IN DISK CASTING

| Temperature | Quantity given in parts/100 parts of resin | | | |
| --- | --- | --- | --- | --- |
| | Ex. I(b) | Ex. II(b) | Ex. III(b) | Ex. IV(c) |
| Catalyst—1½%: | | | | |
| 250° F. | 3 | 1½ | 5 | 1 |
| 300° F. | 4 | 2½ | 7 | 1½ |
| Catalyst—2%: | | | | |
| 210° F. | 2 | 1 | 4 | ½ |
| 250° F. | 3 | 1½ | 4 | 1 |

While we have described our invention in detail in its preferred embodiment, it will be obvious to those skilled in the art, after understanding our invention, that various changes and modifications may be made therein without departing from the spirit or scope thereof. We aim in the appended claims to cover all such modifications and changes.

We claim:

1. A casting composition which consists essentially of copolymerizable mixture of a linear polyester, a vinyl monomer, and a cyclic terpene, the linear polyester being linear polyester of glycol and an aliphatic ethylenically unsaturated dicarboxylic acid, the vinyl monomer being selected from the group consisting of styrene and ring substituted styrene, the proportion of linear polyester to vinyl monomer in said mixture being in the range of about 2–4 parts by weight of linear polyester to about 1 part by weight of vinyl monomer, the amount of cyclic terpene in said mixture being about 0.5% to about 75% by weight of the linear polyester and vinyl monomer in the mixture, said terpene being effective to inhibit formation of cracks, checks and fissures during and subsequent to the curing of said mixture by heat.

2. A composition according to claim 1, said mixture containing about 2½ parts by weight of the mixed propylene glycol polyester of maleic anhydride and phthalic anhydride, about 1 part of styrene, about 1½ percent by weight of a polymerization catalyst, and about 3½ percent by weight of dipentene, the percent of said catalyst and dipentene being based on the total weight of said polyester and styrene.

3. A composition according to claim 1, said mixture containing about 2½ parts by weight of the mixed propylene glycol polyester of maleic anhydride and phthalic anhydride, about 1 part of styrene, about 2 percent by weight of a polymerization catalyst, and about 3 percent by weight of terpinolene, the percent of said catalyst and terpinolene being based on the total weight of said poylester and styrene.

4. A composition in accordance with claim 1 wherein dipentene is the terpene.

5. A composition in accordance with claim 4, wherein the mixed propylene glycol polyester of maleic anhydride and phthalic anhydride is the linear polyster and styrene is the vinyl monomer.

6. A cast infusible plastic product formed by curing with heat a cast mixture consisting essentially of linear polyester, vinyl monomer and cyclic terpene, the linear polyester being linear polyester of glycol and aliphatic ethylenically unsaturated dicarboxylic acid, the vinyl monomer being selected from the group consisting of styrene and ring substituted styrene, the proportion of linear polyester to vinyl monomer in said mixture being in the range of about 2–4 parts by weight of linear polyester to about 1 part by weight of vinyl monomer, the amount of cyclic terpene in said mixture being about amount of cyclic terpene in said mixture being about 0.5% to about 7% by weight of the linear polyester and vinyl inhibit formation of cracks, checks and fissures during and subsequent to the curing thereof.

7. A cast infusible plastic product according to claim 6, the terpene being dipentene.

8. A cast infusible plastic product according to claim 6, the linear polyester being a mixed propylene glycol polyester of maleic anhydride and phthalic anhydride and the vinyl monomer being styrene.

9. A cast infusible plastic product according to claim 6 formed by curing at about 300° F. a mixture consisting essentially of about 2½ parts by weight of the mixed propylene glycol polyester of maleic anhydride and phthalic anhydride, about 1 part of styrene, about 1½ percent by weight of a polymerization catalyst, and about 3½ percent by weight of dipentene, the percent of said catalyst and dipentene being based on the total weight of said polyester and styrene.

10. In the production of an infusible plastic product by the method which comprises casting a linear polyester-vinyl monomer composition, and thereafter heating the cast composition to effect copolymerization of linear polyester and vinyl monomer and form the infusible product, the linear polyester being essentially linear polyester of glycol and aliphatic ethylenically unsaturated dicarboxylic acid, and the vinyl monomer being selected from the group consisting of styrene and ring substituted styrene, the proportion of linear polyester to vinyl monomer being in the range of about 2–4 parts by weight of linear polyester to about 1 part by weight of vinyl monomer, the improvement which comprises including in said linear polyester-vinyl monomer composition cyclic terpene in the amount of about 0.5% to about 7% by weight of the linear polyester and vinyl monomer in said composition, whereby formation of cracks, checks and fissures during and subsequent to the copolymerization is inhibited.

11. The process of claim 10 wherein the cast composition contains about 2½ parts by weight of the mixed propylene glycol polyester of maleic anhydride and phthalic anhydride and about 1 part of styrene in the presence of about 1½ percent by weight of a polymerization catalyst and about 3½ percent by weight of dipentene, the percent of said catalyst and dipentene being based on the total weight of said polyester and styrene, the copolymerization being carried out at about 300° F.

12. The process of claim 10 wherein the cast composition contains about 2½ parts by weight of the mixed propylene glycol polyester of maleic anhydride and phthalic anhydride and about 1 part of styrene in presence of about 2 percent by weight of a polymerization catalyst and about 3 percent by weight of terpinolene, the percent of said catalyst and terpinolene being based on the total weight of said polyester and styrene, the copolymerization being carried out at about 300° F.

13. The process of claim 10, wherein dipentene is the cyclic terpene.

14. The process of claim 13, wherein the mixed propylene glycol polyester of maleic anhydride and phthalic anhydride is the linear polyester and styrene is the vinyl monomer.

References Cited in the file of this patent

UNITED STATES PATENTS

| | | |
|---|---|---|
| 2,586,593 | Armitage et al. | Feb. 19, 1952 |
| 2,600,457 | Wynstra | June 17, 1952 |

FOREIGN PATENTS

| | | |
|---|---|---|
| 580,912 | Great Britain | Sept. 24, 1946 |

UNITED STATES PATENT OFFICE
CERTIFICATE OF CORRECTION

Patent No. 2,884,398 April 28, 1959

Philip A. Thomas et al

It is hereby certified that error appears in the printed specification of the above numbered patent requiring correction and that the said Letters Patent should read as corrected below.

Column 5, line 59, claim 1, for "about 75%" read -- about 7% --; column 6, lines 23 and 24, claim 6, for "amount of cyclic terpene in said mixture being about 0.5% to about 7% by weight of the linear polyester and vinyl" read -- 0.5% to about 7% by weight of the linear polyester and vinyl monomer in the mixture, said terpene being effective to --.

Signed and sealed this 15th day of December 1959.

(SEAL)
Attest:

KARL H. AXLINE
Attesting Officer

ROBERT C. WATSON
Commissioner of Patents